United States Patent Office.

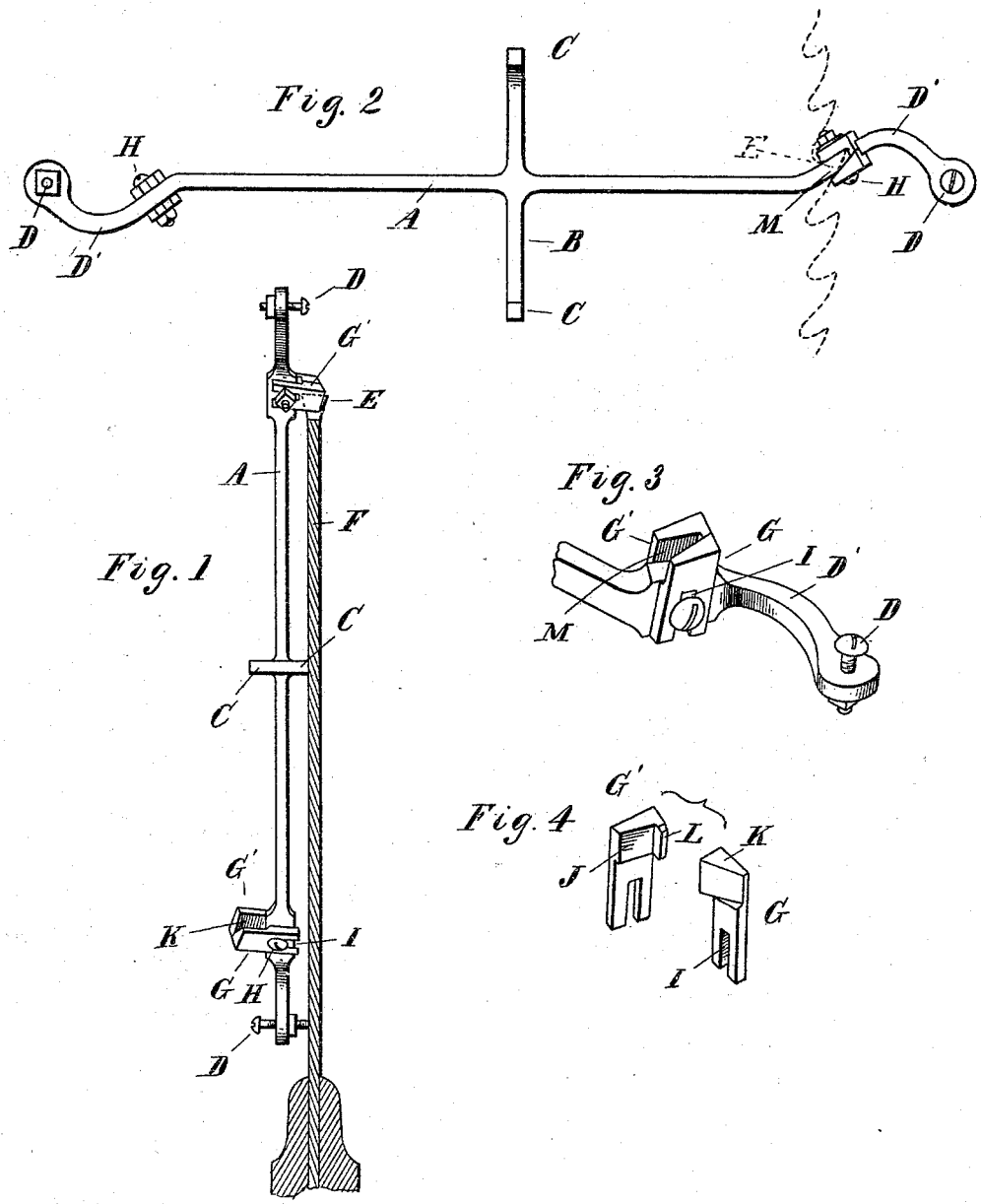

JAMES F. BROWER, OF RODNEY, MICHIGAN, ASSIGNOR OF ONE-HALF TO FRANK BARRY, OF SAME PLACE.

SAW-TOOTH GAGE.

SPECIFICATION forming part of Letters Patent No. 492,187, dated February 21, 1893.

Application filed October 30, 1891. Renewed January 16, 1893. Serial No. 458,622. (No model.)

*To all whom it may concern:*

Be it known that I, JAMES F. BROWER, a citizen of the United States, residing at Rodney, in the county of Mecosta and State of Michigan, have invented certain new and useful Improvements in Saw-Teeth Gages, of which the following is a specification, reference being had therein to the accompanying drawings.

This invention relates to new and useful improvements in saw teeth gages, and the invention consists in the peculiar construction of a frame designed to be placed against the side of a circular saw and carrying at its end or ends gage blocks recessed to fit a tooth of the saw and to extend over the same to form a gage to which the operator may file the saw in dressing the sides thereof.

The invention further consists in the peculiar means employed for adjusting the frame and for the independent adjustment of the gage blocks whereby they may be adjusted to give any desired angle and bevel to the side of the tooth, all as more fully hereinafter described.

In the drawings, Figure 1 shows the saw in section with my improved tool in elevation as applied thereto. Fig. 2 is a side elevation of the gage as applied to the saw. Fig. 3 is a detached perspective view of one end of the frame showing the gage blocks and adjusting screw. Fig. 4 is a detached perspective view of the gage blocks.

My frame consists of a bar A and a central cross-bar B. The bar B is provided at its ends with bearing pins C extending on both sides thereof, as shown in Fig. 1, and adapted to bear against the face of the saw to form a steady support for the frame while in use and also to allow of adjusting the ends of the frame to or from the saw, by means of setscrews D secured at the ends thereof and adapted to bear with their points against the face of the saw. These set screws or adjusting pins are oppositely arranged, one being used when the tool is used upon one side of the saw and the other when it is used upon the opposite side of the saw.

The bar A near its ends is provided with the angular off-sets D' which preferably extend at an angle from the bar substantially the same as the cutting face of the saw tooth E of the saw F, or nearly so.

G and G' are two gage blocks secured to this angular extension by means of a clamping bolt H passing through slots I in said gage blocks and through the frame. These gage blocks are provided with the inclined faces J and also preferably with beveled faces K at the ends and one gage block is provided with an off-set L at its upper edge, all so arranged that when these gage blocks are clamped upon the frame they will form between them an angular recess M of substantially the angle of the end of the tooth, the side of which is desired to be dressed. It is evident that these gage blocks may be rotated upon the clamping bolt H to assume any desired angle to the frame, so that the faces K thereof will stand at any desired angle to the side of the teeth, as shown in Fig. 1, and that they may be adjusted to and from the frame, so that the faces K may be arranged in line or to give any desired bevel to the side of the saw tooth to be dressed.

When the tool thus constructed is placed in the position shown in Fig. 1, the gage blocks having been adjusted as nearly as possible to the desired angle they may be further adjusted to or from the saw by means of the adjusting pins D and then the operator can file the saw tooth down in line with the faces K of the gage blocks, and proceeding entirely around the saw can uniformly dress the teeth, not only giving them the desired angle but also the desired bevel. To dress the other side of the teeth, I provide a pair of oppositely off-set gage blocks at the other end of the frame, the points C extending on both sides of the cross-bar B serving the same purpose and supporting the frame in the middle, and the adjusting pin D at the opposite end serving to adjust the gage blocks to the desired angle.

The necessary bevel to the side of the saw tooth is obtained by adjusting one gage block farther out than the other, and these gage blocks are made of suitably hard metal so that the operator can file the tooth up to them without danger of injury.

What I claim as my invention is—

1. A saw tooth gage consisting of a frame having a central cross bar formed with oppositely projecting pins on its outer ends the frame having inclined angular extensions on its opposite ends, oppositely arranged set screws in the ends of the extensions of the frame and adjustable gage blocks on the extensions extending out at right angles and formed with recesses corresponding substantially with the contour of the saw teeth, substantially as described.

2. A saw tooth gage consisting of a frame provided with independently adjustable gage blocks at its ends, extending out laterally therefrom and set screws in the ends of the frame, substantially as described.

3. A saw tooth gage consisting of a frame provided with adjustable gage blocks at its ends offset to extend across the edge of the saw, substantially as described.

4. A saw tooth gage consisting of a frame, having gage blocks on its ends formed of two members independently adjustable in relation to each other and to the frame and formed with beveled inner faces arranged to engage with the teeth of the saw, substantially as described.

In testimony whereof I affix my signature in presence of two witnesses.

JAMES F. BROWER.

Witnesses:
M. B. O'DOGHERTY,
N. L. LINDOP.